United States Patent [19]

Griffiths

[11] Patent Number: 5,213,341
[45] Date of Patent: May 25, 1993

[54] PRESSURE HARDWARE FOR A MODULAR INTER-WALL ELASTOMER SEAL

[75] Inventor: Carl R. Griffiths, Lansing, Mich.

[73] Assignee: Thunderline Corporation, Belleville, Mich.

[21] Appl. No.: 759,536

[22] Filed: Sep. 13, 1991

[51] Int. Cl.$^5$ ............................................. F16J 15/10
[52] U.S. Cl. ................................... 277/104; 277/192; 277/199; 411/369; 411/399
[58] Field of Search ............... 277/102, 104, 108, 192, 277/199; 285/346; 411/34, 36–38, 368–370, 399, 432, 531, 908, 915

[56] References Cited

U.S. PATENT DOCUMENTS

| | | | |
|---|---|---|---|
| 1,449,418 | 3/1923 | Kinne | 411/368 X |
| 2,258,135 | 1/1941 | Curtis | 411/34 X |
| 2,588,372 | 3/1952 | Erb | 411/432 |
| 2,882,104 | 4/1959 | Guthans | 277/102 X |
| 3,528,668 | 9/1970 | Barton | |
| 3,649,034 | 3/1972 | Barton | |
| 3,703,297 | 11/1972 | Gignac | |
| 4,623,290 | 11/1986 | Kikuzawa et al. | 411/908 X |
| 4,715,756 | 12/1987 | Danico et al. | 411/369 |
| 4,941,358 | 7/1990 | Wing | 411/369 X |
| 4,959,938 | 10/1990 | De Caro | 411/399 X |
| 4,993,724 | 2/1991 | Hauff | 277/199 |

OTHER PUBLICATIONS

DuPont, Product Engineering Bulletin, pp. 1–3, Apr. 1954.
1985 publication of Thunderline Corporation, Catalog No. LS-119-G affording details of prior LINK-SEAL products of Thunderline.
Thundreline Corporation Technical Marketing Literature sheet No. LS-113-B on LINK-SEAL Installation Drawing Dimensions.

Primary Examiner—William A. Cuchlinski, Jr.
Assistant Examiner—Scott W. Cummings
Attorney, Agent, or Firm—Kinzer, Plyer, Dorn, McEachran & Jambor

[57] ABSTRACT

Pressure hardware for a seal block assembly used to form a modular, annular seal around a conduit passing through a wall, the assembly including elastomer seal blocks joined in an annulus around the conduit, the seal blocks having pressure bolt apertures parallel to the conduit; the seal blocks are axially compressed and radially expanded to form the seal. The assembly includes pressure hardware in sets each including a bolt, a matching nut, and a first molded resin pressure plate that has a recess large enough for the bolt head to seat in freely rotatable relation in it, with peripheral access for a wrench around the bolt head; a washer is rotatably positioned in the bottom of the recess, which is deep enough so that the bolt head does not project substantially out of the recess. The first pressure plate has a bolt-receiving aperture large enough to admit the bolt rod but small enough to block the bolt head. A second molded resin pressure plate has a socket complementary to the nut, so that the nut seats it in non-rotatable relation; the second pressure plate also has a bolt-receiving aperture to admit the distal end of the bolt rod into engagement with the nut.

7 Claims, 3 Drawing Sheets

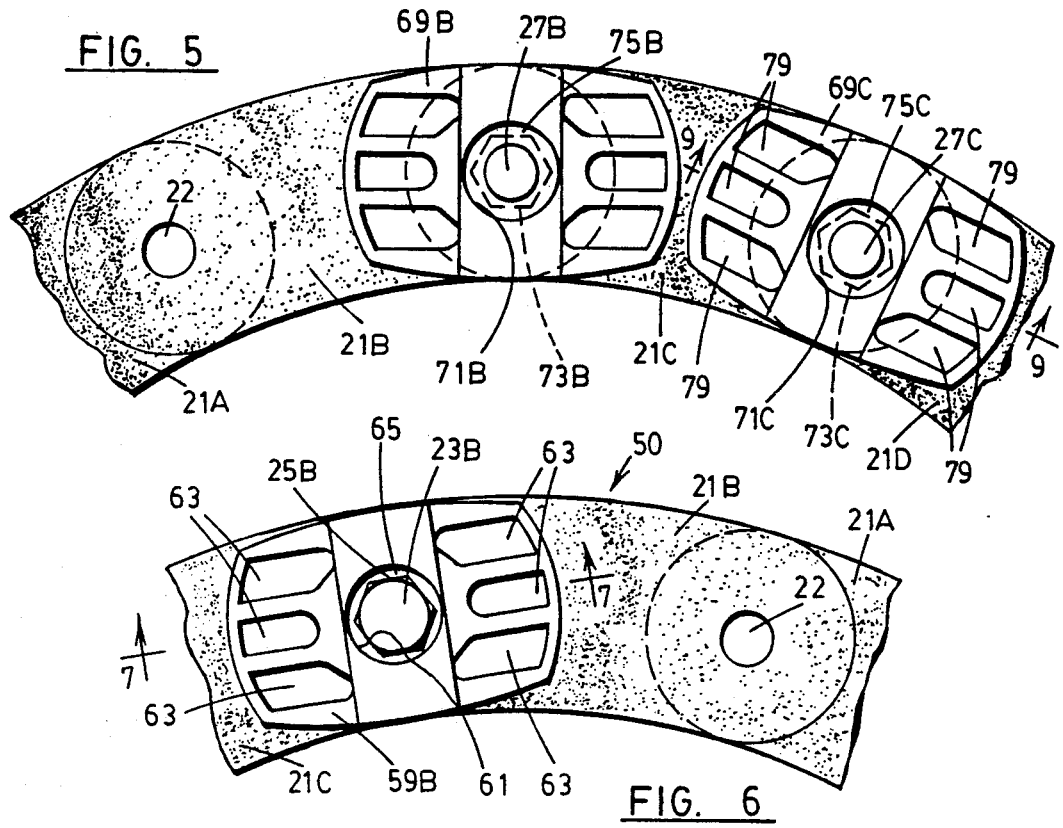

PRESSURE HARDWARE FOR A MODULAR INTER-WALL ELASTOMER SEAL

BACKGROUND OF THE INVENTION

A modular seal assembly that has become a standard device for positive, hydrostatic sealing of the annular space between a pipe or other conduit and a passage or casing through which the conduit extends, usually traversing a wall, is described in Barton U.S. Pat. No. 3,528,668 issued Sept. 15, 1970. Variations of that modular seal construction are disclosed in Barton U.S. Pat. No. 3,649,034 issued Mar. 14, 1972 and in Gignac U.S. Pat. No. 3,703,297 issued Nov. 21, 1972. These annular seals are each made up of a plurality of individual elastomer seal blocks faced with two sets of pressure plates. Bolts that interconnect the pressure plates may also join the blocks in a ring structure surrounding the conduit where it passes through a wall. The bolts are utilized to pull the pressure plates toward each other, once the annular seal structure is in place, compressing the elastomer seal blocks in a direction parallel to of the conduit and expanding the seal blocks radially outwardly in the space between the conduit and the wall passage or other passage. In this way a highly versatile and economical seal structure is formed with a single set of components that may be used for many different conduit sizes. Many years of rugged on-the-job use have demonstrated that this modular, annular conduit-to-wall-opening seal is far superior to most other seal structures.

Despite their proven versatility and value, the modular, annular seals of the aforementioned Barton and Gignac patents, particularly U.S. Pat. No. 3,528,668, have demonstrated some technical difficulties. In large sizes, particularly, the weight of the overall assembly is substantial and may make it difficult for workmen to install, especially due to the use of relatively large and heavy metal components in the pressure hardware that joins and expands/contracts the elastomer seal blocks. The pressure hardware, particularly metal components, have usually entailed non-standard members, so that costs tend to be higher than desirable. At the same time, the exposed metal, in some environments, may be susceptible to undesirable corrosion, particularly galvanic corrosion. The strength of the seal may be less than desirable in some instances. And perhaps the most important problem encountered with these seals pertains to consistency of the required expansion/contraction during installation. It has been difficult if not impossible to specify the tightening of the pressure hardware required to attain the desired positive sealing effect without over-stressing that hardware or some other component of the seal assembly.

SUMMARY OF THE INVENTION

It is a principal object of the present invention, therefor, to provide new and improved pressure hardware for a seal block assembly for forming a modular, annular conduit-to-wall-opening seal from a plurality of elastomer seal blocks, pressure hardware that effectively and economically minimizes or eliminates the technical difficulties of previous known seal assemblies of this general kind.

A more specific object of the invention is to provide new and improved pressure hardware for a seal block assembly utilized to incorporate a plurality of elastomer seal blocks in a modular, annular conduit-to-wall-opening seal, pressure hardware that is simple and economical in construction, yet permits specification of particular torque loadings on the pressure hardware to assure effective seals without damage to the pressure hardware.

Accordingly, the invention relates to a seal block assembly for forming a modular, annular conduit-to-wall-opening seal of the kind comprising a plurality of elastomer seal blocks joined to each other in an annulus around a conduit, each seal block having at least one pressure bolt aperture therethrough parallel to the conduit axis, the seal blocks being axially compressed and radially expanded to form a seal between the conduit and an external encompassing wall. The assembly includes a plurality of sets of pressure hardware for compressing and expanding the seal blocks, each set of pressure hardware comprising a bolt having a plural-facet head of given size and shape integral with one end of a bolt rod, the bolt rod having a threaded portion extending longitudinally from its other end toward its bolt head end. There is a first molded resin pressure plate having a recess larger than the bolt head so that the bolt head seats in freely rotatable relation in the recess, with peripheral access for a wrench around the bolt head, in each pressure hardware set, and with no metal-to-metal sliding contact when the bolt is tightened; the recess is deep enough so that the bolt head does not project substantially out of the recess. The first pressure plate further has a first bolt receiving aperture therethrough, aligned with the recess, the first bolt-receiving aperture being large enough to admit the bolt rod therethrough but small enough so that the bolt head cannot enter. Each pressure hardware set includes a plural-facet nut of predetermined size and shape having an internal aperture threaded to engage the threaded portion of the bolt rod and a second molded resin pressure plate, having a plural-facet socket with a size and shape complementary to the nut so that the nut seats in non-rotatable relation in the socket; the second pressure plate further has a second bolt-receiving aperture therethrough, smaller than the nut, aligned with the socket to admit the other end of the bolt rod into engagement with the nut.

BRIEF DESCRIPTION OF THE DRAWINGS

FIG. 5 is an elevation view taken approximately along line 5—5 in FIG. 4, with one pressure plate omitted;

FIG. 6 is a fragmentary elevation view taken in the opposite direction from FIG. 5;

FIG. 7 is a detail sectional view taken approximately along line 7—7 in FIG. 6;

FIG. 8 is a detail view taken approximately along line 8—8 in FIG. 7;

FIG. 9 is a detail sectional view taken approximately along line 9—9 in FIG. 5; and FIG. 10 is a detail view taken approximately along line 10—10 in FIG. 9.

DESCRIPTION OF THE PREFERRED EMBODIMENT

Figure 1:
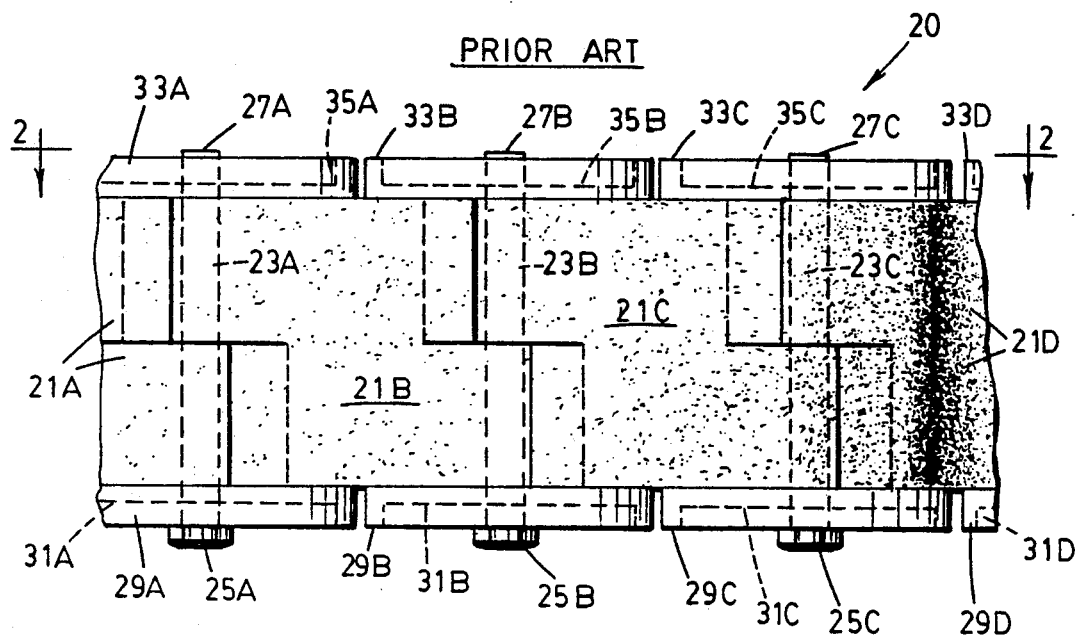
FIG. 1 is a plan view of a part of a prior modular seal block assembly.
Figure 2:
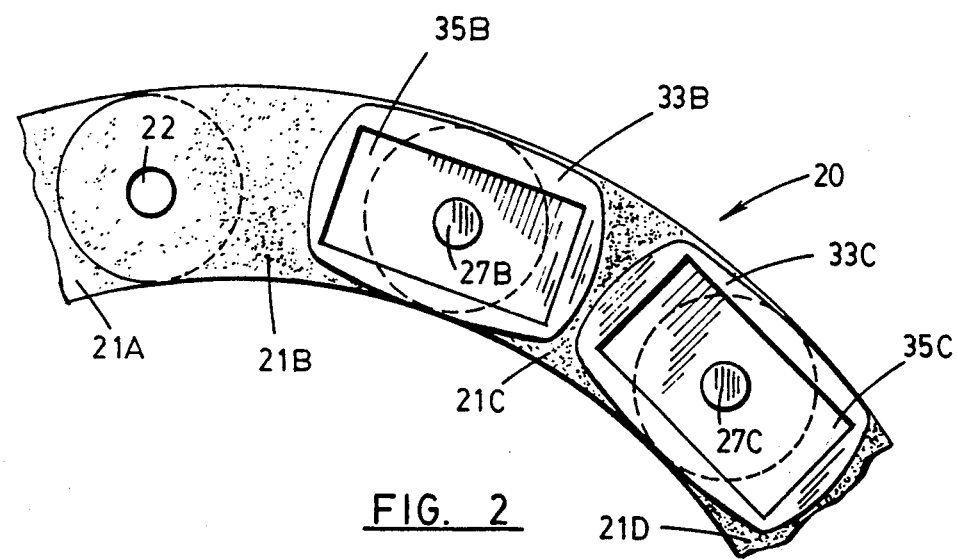
FIG. 2 is an elevation view taken approximately along line 2—2 in FIG. 1, with one pressure plate omitted.
Figure 3:
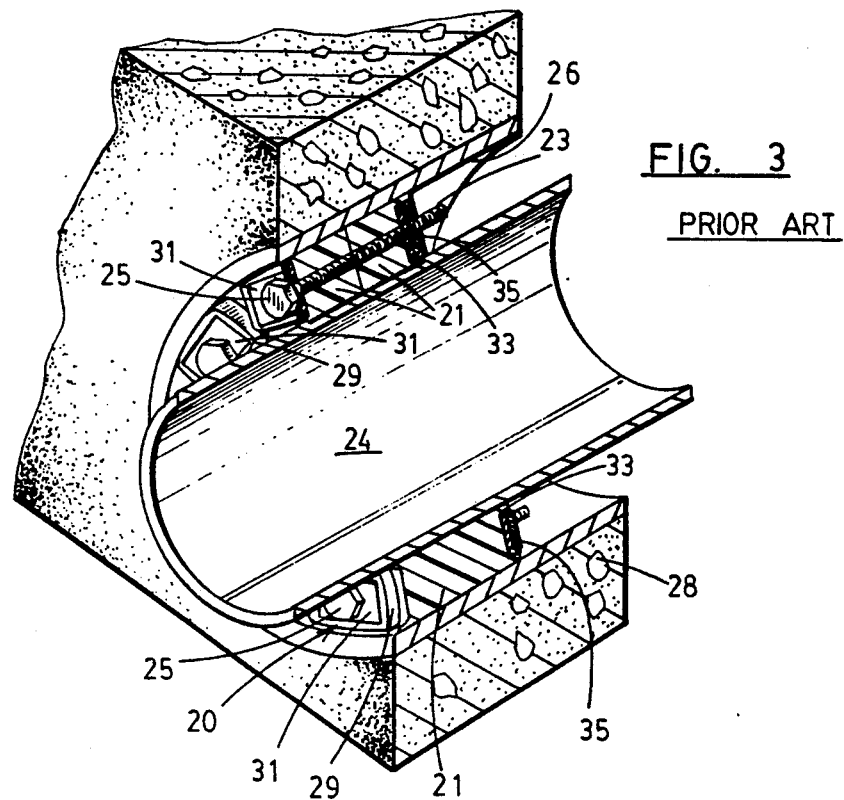
FIG. 3 is a cut-away perspective view employed to explain use of the seal block assembly of FIGS. 1 and 2.

FIGS. 1-3 illustrate a prior seal block assembly 20 for forming a modular, annular conduit-to-wall-opening seal, utilizing a construction that has been known in the art for a number of years and that has been available from Thunderline Corporation of Belleville, Mich., USA under the trademark LINK-SEAL. The seal block assembly 20 is formed of a plurality of elastomer seal blocks 21, designated 21A-21D in FIGS. 1 and 2. These seal blocks are joined to each other in an annulus around a conduit 24 (FIG. 3). Only a portion of assembly 20 is shown in each of FIGS. 1 and 2. Each block has two apertures to receive a pressure bolt; one such aperture 22 is shown in the drawings, FIG. 2. A plurality of pressure bolts extend through these apertures to join the seal blocks in the assembly that is to form the seal, as shown by pressure bolts 23A, 23B, and 23C in FIGS. 1 and 2.

Each of the pressure bolts 23 has a conventional bolt head 25, as indicated by the bolt heads 25A-25C in FIG. 1. The other end of each bolt rod, the distal end of the bolt in relation to its head, includes a relatively long threaded portion. The distal tip ends 27A-27C of the bolts can be seen in FIG. 1; the ends 27B and 27C of two of the bolts appear in FIG. 2.

The head 25 of each bolt 23 engages a composite metal and plastic pressure plate. Referring to FIG. 1, it is seen that each bolt head 25A-25C engages a metal pressure plate 31A-31C positioned within a recess in a plastic pressure plate 29A-29C. The orientation of these members is also shown at the left-hand side of assembly 20 in FIG. 3. The bolt head is entirely external to the pressure plate structure in each instance. At the distal end of each bolt there is a plastic pressure plate 33 having a recess or socket in which a large nut 35 is positioned; see plates 33A-33C and nuts 35A-35C, FIG. 1. This portion of the assembly is best shown in FIG. 2; as seen therein, each of the nuts 35B and 35C is of rectangular configuration and fits in a socket or recess in its plastic pressure plate, the plates 33B and 33C. In practice, the configurations of the plastic plates on the opposite sides of the assembly may be the same.

To complete a seal, as between conduit 24 and a sleeve 26 through a concrete wall 28 (FIG. 3); the elastomer seal blocks 21 are first connected by the pressure hardware comprising the bolts 23, the pressure plates 29, 31 and 33, and the nuts 35, to form a belt. The length of the belt depends upon the number of seal blocks used in it, which in turn depends upon the circumference of conduit 24 (FIG. 3). The belt is disposed around the conduit and the last loose ends of the belt are joined by a final set of the pressure hardware to complete the annulus around the conduit. The seal assembly is then pushed along the conduit, lengthwise, into position in the wall sleeve 26, as shown in FIG. 3. At this point, the pressure bolts 23 are tightened and the pressure plates compress the elastomer blocks 21 in a direction parallel to conduit 24. This expands the elastomer blocks in a direction radial to the conduit and forms a continuous, air-tight, water-tight seal between the pipe or other conduit 24 and the sleeve 26 in the wall.

FIGS. 4-10 illustrate a seal block assembly 50 that incorporates one embodiment of the improved pressure hardware of the present invention. Seal block assembly 50, FIGS. 4-6, may include the same elastomer block members as in the previously described prior art seal assembly. Thus, the elastomer blocks 21A-21D are shown joined together by bolts 23 that extend through the pressure bolt apertures in the blocks, such as aperture 22, FIGS. 5 and 6. The bolt heads 25A-25D are unchanged from the previous embodiment; indeed, the bolts 23 are interchangeable between the old and new assemblies. It is the remainder of the pressure hardware that is substantially modified in FIGS. 4-10 and that affords the improvements of the present invention.

Figure 4:
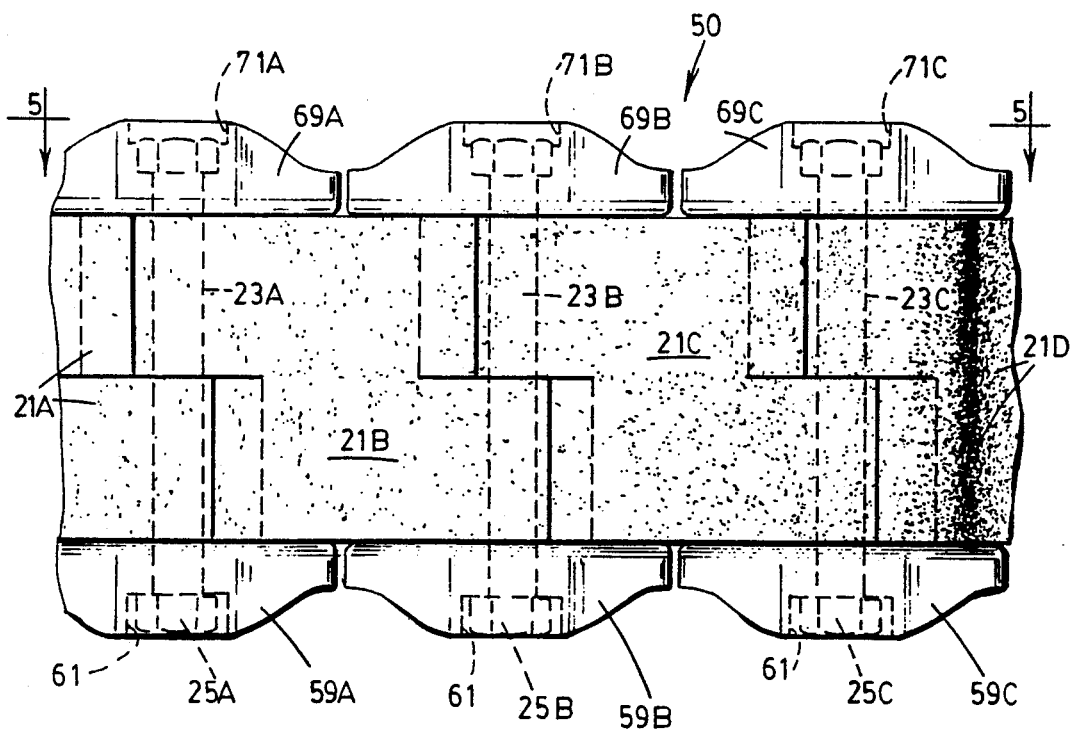
FIG. 4 is a plan view, like FIG. 1 of a part of a modular seal block assembly that includes the pressure hardware of the invention.

Each set of pressure hardware utilized in assembly 50 includes the aforementioned conventional bolt and a first molded resin pressure plate 59; four of these molded resin pressure plates 59A-59C are shown in FIG. 4 with one plate 59B appearing in FIG. 6. FIGS. 7 and 8 provide further details of construction of the pressure plates. Thus, each pressure plate 59 has a central recess 61 that is larger than the bolt head 25 seated in the recess (FIGS. 4, 6 and 7) so that the bolt head is freely rotatable relation in the recess. Lateral depressions 63 on the opposed outer sides of each resin pressure plate 59 may be provided, primarily to reduce the cost of the pressure plate. As is apparent in both FIGS. 6 and 7, recess 61 is large enough to afford peripheral access to bolt head 25, so that a wrench can be fitted around the bolt head 25 seated in the recess.

A metal washer 65 is positioned in the bottom of recess 61, between bolt head 25 and the base of the recess. Recess 61 is deep enough so that bolt head 25 does not project substantially out of the recess, though the outer surface of the bolt head may be slightly above the outer surface of plastic pressure plate 59; see FIG. 7. The projection of bolt head 25 out of pressure plate 59 is preferably less than 0.125 inch (0.3 cm). Plastic pressure plate 59 has a bolt-receiving aperture 67 through the bottom of the pressure plate, aligned with recess 61; aperture 67 is large enough to admit the rod portion of a bolt 23 but small enough so that neither washer 65 nor bolt head 25 can enter.

For each bolt 23 in assembly 50 there is also a second molded resin pressure plate 69. The construction of the pressure plates 69 is best shown in FIGS. 4, 5, 9 and 10. Each of the second pressure plates 69 has a plural-facet socket 71. The size and shape of socket 71 is complementary to a plural-facet nut 73 that is included in each set of the improved pressure hardware. Each nut 73 could be an ordinary, conventional hexagonal machine nut, but the preferred construction for large-size seals includes a flange 75 that seats in the upper rim portion of each socket 71 to afford a slightly larger surface area for absorption of forces applied to the nut by the bolt 23. Of course, the illustrated construction locks each nut 73 into its socket 71 so that the nut cannot rotate in the socket. Each second pressure plate 69 has a central aperture 77 through which bolt 23 extends into threaded engagement in nut 73 (FIG. 9), and preferably has depressions 79 to reduce weight and cost.

The elastomer compositions used for elastomer blocks 21 may be the same as have been employed for various applications in the past. A frequently used elastomer is EPDM (ethylene-propylene diene monomer) having a specific gravity of 1.09, a tensile strength of 1500 psi, an elongation of 570% and a hardness of 50, durometer A. Other elastomers may also be used, including silicone elastomers, depending on the application and user's needs. Pressure plates 59 and 69 are preferably molded of fiber-filled thermoplastic polyamide; a 6—6 nylon 30% filled with glass fibers is preferred.

The pressure hardware of the invention is lighter in weight and less expensive than the previously known pressure hardware for comparable seals. The weight reduction makes installation easier on large seals, as for conduits of eighteen inches (46 cm) diameter and larger. The exposed metal is materially reduced, and only small metal portions are accessible, minimizing corrosion difficulties, yet the seal structures are stronger than before.

In the invention there is no metal-to-metal sliding contact entailed in tightening the pressure hardware; this is quite unlike the high-friction sliding contact between each bolt head 25 and its adjacent metal pressure plate 31 in the prior construction shown in FIGS. 1–3. In the pressure hardware of the invention, bolt head 25 and washer 65 turn together when the bolt is tightened; the only sliding engagement is between washer 65 and the bottom of recess 61 (see FIG. 7), at a much-reduced friction level. The consequences are substantial. To begin with, it is easier for the installer to tighten the pressure bolts. Moreover, the seal supplier can specify the torque for tightening the pressure bolts to complete the seal. A seal using the invention can be completed by successive tightening of its pressure bolts in a specified program of incremental steps; a program of successive tightening of all bolts in a seal in steps of five, ten, fifteen, and twenty footpounds, using an appropriate torque wrench, is typical. The capability of specifying a final torque for an acceptable seal (e.g., 20 ft. lbs.) has not been previously available, due at least in part to the metal-to-metal interface in prior pressure hardware.

I claim:

1. In a seal block assembly for forming a modular, annular conduit-to-wall-opening seal of the kind comprising a plurality of elastomer seal blocks joined to each other in an annulus around a conduit, each seal block having at least one pressure bolt aperture therethrough parallel to the conduit axis, the seal blocks being axially compressed and radially expanded to form a seal between the conduit and an external encompassing wall, the assembly including a plurality of sets of pressure hardware for compressing and expanding the seal blocks, each set of pressure hardware comprising:

a bolt having a plural-facet head of given size and shape integral with one end of a bolt rod, the bolt rod having a threaded portion extending longitudinally from its other end toward its bolt head end;

a first molded resin pressure plate having a recess larger than the bolt head so that the bolt head seats in freely rotatable relation in the recess, with peripheral access for a wrench around the bolt head and with no metal-to-metal sliding contact when the bolt is tightened;

the recess being deep enough so that the bolt head does not project substantially out of the recess;

a second molded resin pressure plate having a stepped socket facing outwardly of the pressure plate, the socket having an inner plural-facet socket portion of predetermined depth and given maximum transverse dimension and an outer socket portion having a transverse dimension greater than the maximum transverse dimension of the inner socket portion, with a shelf at the outer edge of the inner socket portion affording an annular bottom surface for the outer socket portion;

and a plural-facet nut of predetermined size and shape, complementary to the inner socket portion so that the nut seats entirely therein in non-rotatable relation, the nut having an internal aperture threaded to engage the threaded portion of the bolt rod, the nut having an integral flange on its outer side, engaging the bottom surface of the outer socket portion to distribute stress from the bolt and nut to the second pressure plate;

the second pressure plate further having a second bolt-receiving aperture therethrough, smaller than the nut, aligned with the socket to admit the other end of the bolt rod into engagement with the nut.

2. Pressure hardware for an elastomer seal block assembly, according to claim 1, in which in each set further comprises:

a washer adapted to be rotatably positioned in the recess between the bolt head and the bottom of the recess.

3. Pressure hardware for an elastomer seal block assembly, according to claim 1, in which the pressure plates are molded of 6—6 nylon with 30% glass fiber filling.

4. Pressure hardware for an elastomer seal block assembly, according to claim 2, in which the bolt in each set of pressure hardware is a hexagonal head steel bolt.

5. Pressure hardware for an elastomer seal block assembly, according to claim 4, in which the nut in each set is a hexagonal seal nut having an integral annular flange on one side thereof.

6. Pressure hardware for an elastomer seal block assembly, according to claim 5, in which the pressure plates are molded of 6—6 nylon with 30% glass fiber filling.

7. Pressure hardware for an elastomer seal block assembly, according to claim 9, in which each pressure plate includes a plurality of lateral depressions in the outer surface to reduce the weight of the pressure plate.

* * * * *

UNITED STATES PATENT AND TRADEMARK OFFICE
CERTIFICATE OF CORRECTION

PATENT NO. : 5,213,341
DATED : May 25, 1993
INVENTOR(S) : Carl R. Griffiths

It is certified that error appears in the above—identified patent and that said Letters Patent is hereby corrected as shown below:

Col. 6, line 50, cancel "9" and substitute -- 1 --.

Signed and Sealed this

Eighth Day of February, 1994

BRUCE LEHMAN

Attest:

Attesting Officer    Commissioner of Patents and Trademarks